(12) United States Patent
Xu et al.

(10) Patent No.: US 12,449,450 B2
(45) Date of Patent: Oct. 21, 2025

(54) INDUCTOR CURRENT ESTIMATION METHOD FOR DC-DC SWITCHING POWER SUPPLY

(71) Applicant: SOUTHEAST UNIVERSITY, Nanjing (CN)

(72) Inventors: Shen Xu, Nanjing (CN); Chenxi Yang, Nanjing (CN); Yijie Qian, Nanjing (CN); Yujie Liu, Nanjing (CN); Limin Yu, Nanjing (CN); Weifeng Sun, Nanjing (CN); Longxing Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/567,039

(22) PCT Filed: Aug. 3, 2022

(86) PCT No.: PCT/CN2022/110105
§ 371 (c)(1),
(2) Date: Dec. 5, 2023

(87) PCT Pub. No.: WO2023/098127
PCT Pub. Date: Jun. 8, 2023

(65) Prior Publication Data
US 2024/0280613 A1    Aug. 22, 2024

(30) Foreign Application Priority Data
Nov. 30, 2021    (CN) .......................... 202111439320.3

(51) Int. Cl.
*G01R 19/25*    (2006.01)
*G01R 15/04*    (2006.01)
(Continued)

(52) U.S. Cl.
CPC .............. *G01R 19/25* (2013.01); *G01R 15/04* (2013.01); *G01R 19/0038* (2013.01);
(Continued)

(58) Field of Classification Search
CPC .... G01R 19/25; G01R 15/04; G01R 19/0038; H02M 1/0009; H02M 3/157; H02M 3/158; H02M 3/156; H02M 3/1588; Y02B 70/10
See application file for complete search history.

(56) References Cited

U.S. PATENT DOCUMENTS

2002/0070888 A1    6/2002    Groiss et al.
2008/0164859 A1*   7/2008    Peng ..................... H02M 3/157
                                                                  323/318
(Continued)

FOREIGN PATENT DOCUMENTS

CN    104467470 A    3/2015
CN    108551336 A    9/2018
(Continued)

OTHER PUBLICATIONS

Rajat Channappanavar, et al., An Inductor Current Estimator for Digitally Controlled Synchronous Buck Converter, IEEE Transactions on Power Electronics, 2019, pp. 4883-4894, vol. 34, No. 5.

*Primary Examiner* — Lee E Rodak
*Assistant Examiner* — Zannatul Ferdous
(74) *Attorney, Agent, or Firm* — Bayramoglu Law Offices LLC

(57) ABSTRACT

An inductor current estimation method for a DC-DC switching power supply using a voltage sampling module, a data conversion module, a switching signal counting module, an inductor voltage calculation module and a digital filter module, comprising: processing an input voltage and an output voltage by the voltage sampling module and the data
(Continued)

conversion module to obtain a converted input voltage and a converted output voltage which have a same number of bits; comparing a node voltage with a reference voltage, and then obtaining a duty cycle by the switching signal counting module; and then, outputting an average voltage of two terminals of an inductor and a parasitic resistor by the inductor voltage calculation module, and finally, obtaining an estimated inductor current by the digital filter module.

6 Claims, 4 Drawing Sheets

(51) Int. Cl.
*G01R 19/00* (2006.01)
*H02M 1/00* (2007.01)
*H02M 3/157* (2006.01)
*H02M 3/158* (2006.01)

(52) U.S. Cl.
CPC ......... *H02M 1/0009* (2021.05); *H02M 3/157* (2013.01); *H02M 3/158* (2013.01)

(56) References Cited

U.S. PATENT DOCUMENTS

| | | | |
|---|---|---|---|
| 2010/0253154 A1* | 10/2010 | Yeates | H02M 3/07 307/110 |
| 2014/0097821 A1* | 4/2014 | Chen | G05F 1/468 323/293 |

FOREIGN PATENT DOCUMENTS

| | | |
|---|---|---|
| CN | 109995231 A | 7/2019 |
| CN | 110470901 A | 11/2019 |
| CN | 110504830 A | 11/2019 |
| CN | 114157145 A | 3/2022 |

\* cited by examiner

INDUCTOR CURRENT ESTIMATION METHOD FOR DC-DC SWITCHING POWER SUPPLY

CROSS REFERENCE TO RELATED APPLICATIONS

This application is a national stage entry of International Application No. PCT/CN2022/110105, filed on Aug. 3, 2022, which is based upon and claims foreign priority to Chinese Patent Application No. 202111439320.3, filed on Nov. 30, 2021, the entire contents of which are incorporated herein by reference.

TECHNICAL FIELD

The invention belongs to the field of switching power supplies, and particularly relates to an inductor current estimation method for a DC-DC switching power supply.

BACKGROUND

With the continuous development of science and technology, a large variety of electronic equipment, including various small portable wearable electronic devices such as mobile phones, smartwatches and tablet personnel computers, as well as large automotive electronic and medical instruments, appear in and exert an influence and improvement on people's life. The constant upgrading and updating of consumer electronics lead to increasingly powerful functions of electronic products, and a stable power supply system is required to maintain the normal operation of the electronic products. Moreover, since the size of electronic products is becoming ever smaller, high-performance power management chips are necessary for improving the power supply efficiency of the electronic products before a groundbreaking innovation of battery technology.

At present, switching power supplies are developing mainly towards high efficiency, small area, quick transient response, high driving capacity and digitization, wherein the study of digitization is one of the fastest-developing branches of the switching power supplies. It is estimated that the global market share of digital management integrated circuits (ICs) in 2022 has reached 42 billion dollars, and the market share of digital power management chips in lighting, consumer electronics, and industrial and automotive electronics is increasing constantly. Compared with analog-controlled power supply chips, digital-controlled DC-DC switching power supplies can be integrated in various SoC chips more easily to realize a high level of integration. In addition, by adopting digital control, a more complex control algorithm can be implemented to make digital switching power supplies more flexible when used for debugging and monitoring various parameters of chips, and the number of discrete devices of a control system can be reduced to improve the reliability of the control system.

In DC-DC switching power supplies, the inductor current, as an important feedback signal of a control circuit, is used for loop control of current mode controllers such as average current mode controllers, peak current mode controllers and lagging current controllers. The inductor current is also used for over-current protection of converters, In most DC-DC switching power supply systems, inductor current information needs to be measured in real time to guarantee the safe operation of the systems. Generally, the current of DC-DC switching power supplies is measured through a voltage drop-based measurement method or an observer-based measurement method. The voltage drop-based measurement method extracts current information from a voltage drop caused when a current passes through a sensing inductor or a MOSFET. The observer-based system estimates the current generally according to the voltage of a power-level inductor.

In most cases, existing methods are not suitable for the integration of digital controllers of switching power supplies because of the main difficulties in overall size, system cost and overall efficiency. On the one hand, the voltage drop-based measurement method either reduces the efficiency of a converter or requires a high-bandwidth amplifier, which is extremely challenging in the latest CMOS digital process because a standard digital circuit has a limited supply voltage and is not applicable to traditional analog structures. Such a framework requires a larger-size and lower-reliability multi-chip solution and adopts different IC techniques to implement a sensing circuit and a controller. On the other hand, the observer-based measurement method has limited accuracy, and realizes current estimation based on prior data of inductance and equivalent series resistance, which may change under different working conditions and external influence factors. In addition, regarding the implementation of the digital controller, a signal output by a sensor needs to be transmitted to the digital controller through an analog-to-digital converter (ADC), and the use of a switching frequency component of the inductor current, namely an AC ripple component, in the controller relies on a high-bandwidth current sensor and an ADC, the sampling frequency of which should be far higher than the switching frequency. The high requirement for the ADC is an obvious defect for DC-DC switching power supplies with a high switching frequency. Therefore, it is expected to avoid the use of a high-speed ADC and a high-bandwidth sensor for sampling the inductor current in the digital controller.

SUMMARY

Objective of the invention: To overcome the limitations and drawbacks in the prior art, the invention provides an inductor current estimation method for a DC-DC switching power supply, which can accurately estimate real-time inductor current information under the condition of merely sampling an input voltage and an output voltage. The inductor current estimation method provided by the invention avoids the addition of an extra analog sampling circuit such as a resistor, a capacitor or an operational amplifier and also avoids the use of a high-speed ADC with a sampling frequency much higher than the switching frequency, thus reducing the cost and circuit size and having high universality.

Technical solution: To fulfill the above objective, the invention adopts the following technical solution:

An inductor current estimation method for a DC-DC switching power supply uses a voltage sampling module, a data conversion module, a switching signal counting module, an inductor voltage calculation module and a digital filter module, and comprises: inputting an input voltage and an output voltage of a DC-DC switching power supply to the voltage sampling module to obtain an input voltage digital quantity and an output voltage digital quantity, then performing an operation and bit conversion by the data conversion module to obtain a converted input voltage and a converted output voltage which have a same number of bits, and outputting the converted input voltage and the converted output voltage to the inductor voltage calculation module; comparing a node voltage with a reference voltage by a comparator to output actual switching signals, then obtaining a duty cycle by the switching signal counting module and outputting the duty cycle to the inductor voltage calculation module; and then, calculating, by the inductor voltage calculation module, an average voltage of two terminals of an inductor and a parasitic resistor, and finally, performing filtering by the digital filter module to obtain an estimated inductor current.

Wherein, the voltage sampling module comprises a sampling circuit and an analog-to-digital converter (ADC), the sampling circuit samples voltages, obtained by scaling the input voltage and the output voltage in proportion, by means of voltage dividing resistors, and the voltages are amplified by single-ended to differential amplifiers and then output to the corresponding ADC, such that the input voltage digital quantity and the output voltage digital quantity are obtained finally.

The data conversion module receives the input voltage digital quantity and the output voltage digital quantity and operates according to the following formulas to obtain an actual input voltage $V_{in}$ and an actual output voltage $V_o$, $$V_{in} = \left(\frac{D_{in}[n]}{2^{N_1-1}} - 1\right) \cdot \frac{V_1}{G_1}$$

$$V_o = \left(\frac{D_o[n]}{2^{N_2-1}} - 1\right) \cdot \frac{V_2}{G_2}$$

Where, $D_{in}[n]$ is the input voltage digital quantity, $D_o[n]$ is the output voltage digital value, and n indicates that the corresponding digital quantity is in a $n^{th}$ period; the number of ADC bits of the input voltage and the number of ADC bits of the output voltage are $N_1$ and $N_2$ respectively, and an input range of the input voltage and an input range of the output voltage are $\pm V_1$ and $\pm V_2$ respectively; $G_1$ and $G_2$ are an input sampling gain coefficient and an output sampling gain coefficient;

Finally, the actual input voltage $V_{in}$ and the actual output voltage $V_o$ obtained by the operation are converted into digital quantities with a same number of bits by bit conversion, namely the converted input voltage and the converted output voltage.

The input sampling gain coefficient and the output sampling gain coefficient are calculated by:

$$G_1 = A_1 \cdot \frac{R_2}{R_1 + R_2}$$

$$G_2 = A_2 \cdot \frac{R_4}{R_3 + R_4}$$

Where, $R_1$ and $R_2$ are a pair of voltage dividing resistors for the input voltage, $R_3$ and Ra are a pair of voltage dividing resistors for the output voltage, and $A_1$ and $A_2$ are amplification coefficients of the single-ended to differential amplifiers for sampling the input voltage and the output voltage respectively.

The switching signal counting module is configured to detect and count the switching signals, and the node voltage is compared with the reference voltage by the comparator to output the switching signals; if an upper switching transistor is turned off and a lower switching transistor is turned on, the node voltage is a ground potential and is less than the reference voltage, and the comparator outputs a switching signal 0; if the upper switching transistor is turned on and the lower switching transistor is turned off, the node voltage is the input voltage and is greater than the reference voltage, and the comparator outputs a switching signal 1; and switching signals 1 output within a fixed period $T_s$ are counted by a high-frequency counter, and the duty cycle in each period is output.

The duty cycle is calculated by:

$$\text{duty}[n] = k_n/m$$

Where, duty[n] is the duty cycle, m is a total number of times of counting permitted within the fixed period $T_s$, and $k_n$ is the number of switching signals within the $n^{th}$ fixed period $T_s$.

The average voltage of the two terminals of the inductor and the parasitic resistor is calculated by:

$$V_{iL}[n] = \text{duty}[n] \cdot V_{in}[n] - V_o[n]$$

Where, $V_{iL}[n]$ is the average voltage of the two terminals of the inductor and the parasitic resistor, $V_{in}[n]$ is the converted input voltage, and $V_o[n]$ is the converted output voltage.

Beneficial effects: Compared with the prior art, the invention has the following advantages and remarkable effects:

1. With a BUCK switching power supply as a typical application, the inductor current estimation method for a DC-DC switching power supply provided by the invention does not use an analog sampling circuit as compared with traditional inductor current sampling schemes, thus avoiding a complex sampling circuit design and greatly reducing the current sampling cost;
2. Compared with traditional filtering schemes, the digital filter scheme used for calculating the inductor current in the invention can effectively reduce the sampling frequency of the input voltage and the output voltage and avoids the use of an expensive high-speed ADC; by calculating the average voltage by counting, only one operation needs to be completed within multiple counting cycles, thus greatly shortening the cycle of each step of operation and effectively lowering the requirement of the method for the calculating speed;
3. Compared with traditional digital estimation schemes, the inductor current estimation method provided by the invention not only can estimate the average value of the inductor current, but also can estimate the ripple value of the inductor current, thus being suitable for a current ripple-based control circuit; in addition, the inductor current estimation method has a high speed and a low delay, thus being able to quickly and accurately following the change of the actual inductor current;
4. The inductor current estimation method provided by the invention can be implemented by a pure digital circuit and can be integrated in various application scenarios to realize digital sampling of the inductor current without adding a complex peripheral circuit, thus having high flexibility and integrity.

In the FIGS: $V_{in}$, input voltage; $V_o$, output voltage; $D_{in}[n]$, input voltage digital quantity: $D_o[n]$, output voltage digital quantity; $V_{in}[n]$, converted input voltage; $V_o[n]$, converted output voltage; MOS1, upper switching transistor; MOS2, lower switching transistor; $V_x$, node voltage; $V_{ref}$, reference voltage; duty[n], duty cycle; L, inductor; $R_L$, parasitic resistor; $V_{iL}[n]$, average voltage of two terminals of the inductor L and the parasitic resistor $R_L$; $I_L[n]$, inductor current.

DETAILED DESCRIPTION OF THE EMBODIMENTS

Figure 1:
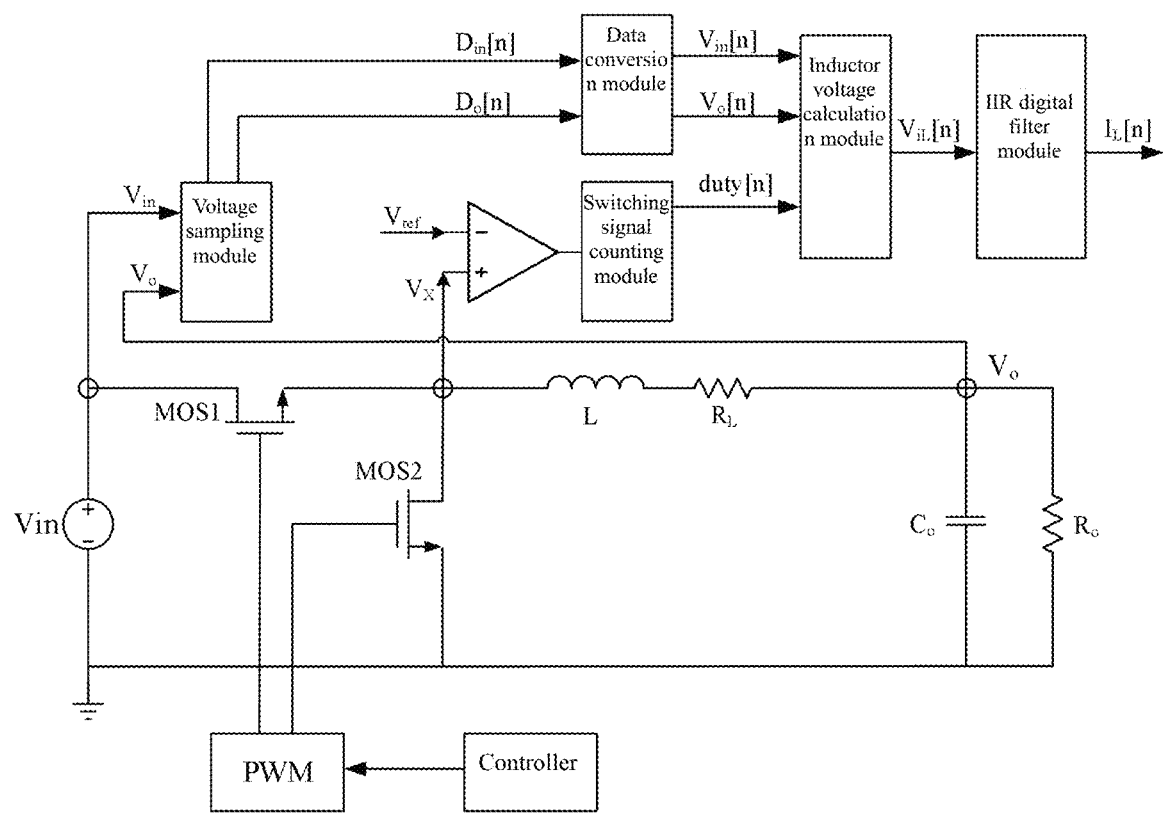
FIG. 1 is a system structure block diagram of an inductor current estimation method applied to a BUCK switching power supply according to the invention.

Referring to FIG. 1 which is a system structure block diagram of an inductor current estimation method applied to a BUCK switching power supply according to the invention, the inductor estimation method uses a voltage sampling module, a data conversion module, a switching signal counting module, an inductor voltage calculation module and a digital filter module, and synchronous rectification BUCK controls an output voltage by controlling the on-time and off-time of an upper switching transistor MOS1 and a lower switching transistor MOS2. Wherein, an input voltage $V_{in}$ and an output voltage $V_o$ of a DC-DC switching power supply are input to the voltage sampling module to obtain an input voltage digital quantity $D_{in}[n]$ and an output voltage digital quantity $D_o[n]$, and then the data conversion module performs an operation and bit conversion to output digital quantities corresponding to analog quantities of the input voltage $V_{in}$ and the output voltage $V_o$, namely a converted input voltage $V_{in}[n]$ and a converted output voltage $V_o[n]$; a node voltage $V_x$ at an intermediate node of the upper switching transistor MOS1 and the lower switching transistor MOS2 is compared with a reference voltage $V_{ref}$ by a comparator to output an actual switching signal SW, and switching signals which are 1 within a period are counted by the switching signal counting module to obtain a duty cycle duty[n]; the digital quantities are calculated by the inductor voltage calculation module to output an average voltage $V_{iL}[n]$ of two terminals of an inductor L and a parasitic resistor $R_L$ within a fixed period, and then filtering is performed by the infinite impulse response (IIR) digital filter module to output an estimated inductor current $I_L[n]$ finally, wherein n indicates that the corresponding digital quantity is within an $n^{th}$ period;

If the pole coefficient of a digital filter matches the parameters of the inductor L and the parasitic resistor $R_L$ in the circuit, the digital filter can finally output the estimated inductor current $I_L[n]$ within a fixed period $T_s$. If a sampling period $T_s$ of the digital filter is far smaller than a switching period $T_{sw}$, the inductor current $I_L[n]$ finally output by the digital filter not only includes an average value $I_{L\_A}$ of an actual inductor current $I_L$ but also reflects ripple information of the actual inductor current.

Figure 2:
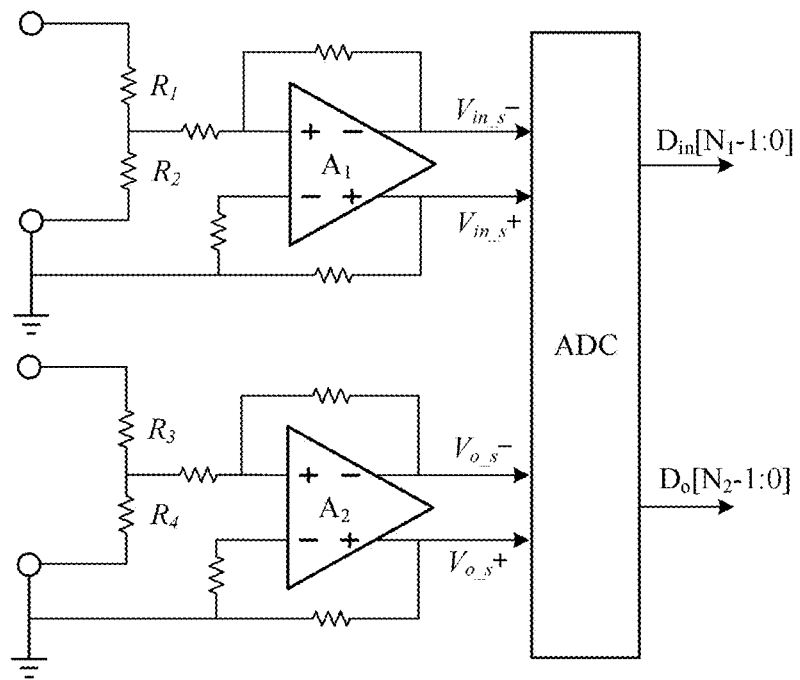
FIG. 2 is a circuit diagram of a voltage sampling module.

Referring to FIG. 2 which is a structural diagram of the voltage sampling module, the voltage sampling circuit comprises a sampling circuit and an analog-to-digital converter (ADC), the sampling circuit scales the input voltage $V_{in}$ and the output voltage $V_o$ by means of voltage dividing resistors and then amplifies signals by means of single-ended to differential amplifiers, and the ADC outputs the corresponding input voltage digital quantity $D_{in}$ and output voltage digital quantity $D_o$. In FIG. 2, differential signals finally output by the sampling circuit may be expressed by formula (1) and formula (2):

$$V_{in\_s}^+ - V_{in\_s}^- = V_{in} \cdot A_1 \cdot \frac{R_2}{R_1 + R_2} \quad (1)$$

$$V_{o\_s}^+ - V_{o\_s}^- = V_o \cdot A_2 \cdot \frac{R_4}{R_3 + R_4} \quad (2)$$

Where, $V_{in\_s}^+$ and $V_{in\_s}^-$ are differential signals corresponding to the input voltage $V_{in}$ output by the sampling circuit, $V_{o\_s}^+$ and $V_{o\_s}^-$ are differential signals corresponding to the output voltage $V_o$ output by the sampling circuit, $R_1$ and $R_2$ are a pair of voltage dividing resistors for the input voltage $V_{in}$, $R_3$ and $R_4$ are a pair of voltage dividing resistors for the output voltage $V_o$, and $A_1$ and $A_2$ are amplification coefficients of the single-ended to differential amplifiers for sampling the input voltage $V_{in}$ and the output voltage $V_o$ respectively.

Formula (3) and formula (4) can be obtained:

$$G_1 = A_1 \cdot \frac{R_2}{R_1 + R_2} \quad (3)$$

$$G_2 = A_2 \cdot \frac{R_4}{R_3 + R_4} \quad (4)$$

Where, $G_1$ and $G_2$ are an input sampling gain coefficient of the input voltage $V_{in}$ and an output sampling gain coefficient of the output voltage $V_o$ respectively.

Considering that the input voltage $V_{in}$ and the output voltage $V_o$ will be calculated later in the same unit, while the voltage sampling module adopts different sampling magnifications for the input voltage $V_{in}$ and the output voltage $V_o$, the sampling accuracy of the output voltage $V_o$, as required, is often higher than that of the input voltage $V_{in}$ and the number of ADC bits of the input voltage $V_{in}$ is different from the number of ADC bits of output voltage $V_o$, the input voltage digital quantity $D_{in}[n]$ and the output voltage digital quantity $D_o[n]$ output by the ADC need to be preliminarily calculated by the data conversion module according to formula (5) and formula (6) before being used for subsequent operation:

$$V_{in} = \left(\frac{D_{in}[n]}{2^{N_1-1}} - 1\right) \cdot \frac{V_1}{V_1} \quad (5)$$

$$V_o = \left(\frac{D_o[n]}{2^{N_2-1}} - 1\right) \cdot \frac{V_2}{G_2} \quad (5)$$

Where, the number of ADC bits of the input voltage $V_{in}$ and the number of ADC bits of the output voltage $V_o$ are $N_1$ and $N_2$ respectively, and an input range of the input voltage $V_{in}$ and an input range of the output voltage $V_o$ are $\pm V_1$ and $\pm V_2$ respectively;

The data conversion module finally converts the input voltage $V_{in}$ and the output voltage $V_o$, obtained by operation, into digital quantities with the same number of bits, namely the converted input voltage $V_{in}[n]$ and the converted output voltage $V_o[n]$, by bit conversion.

Theoretically, an average node voltage $V_{x\_ave}$ of the intermediate node of the upper switching transistor MOS1 and the lower switching transistor MOS2 is equal to an average output voltage $V_{o\_ave}$. However, in an actual circumstance where the parasitic resistor $R_L$ is taken into account, the relation between the average output voltage $V_{o\_ave}$, the average node voltage $V_{x\_ave}$ and an average inductor current $I_{L\_A}$ is indicated by formula (7):

$$\langle V_{X\_ave} \rangle_{T_{SW}} = V_{o\_ave} + I_{L\_A} \cdot R_L \quad (7)$$

Where, $T_{sw}$ is the switching period, and $R_L$ is the resistance of the parasitic resistor.

In the above formula, the input voltage $V_{in}$ and the output voltage $V_o$ are available and are constants within the switching period $T_{sw}$, and this is an important condition that must be satisfied when the above formula is used for current estimation. In variable-frequency control, the switching period $T_{sw}$ will change with the working condition, and in a digital control system, it is difficult to resolve the average value of a parameter within an uncertain period through a digital solution. To solve this problem, the switching period $T_{sw}$ can be divided into multiple equal small fixed periods $T_s$ with a frequency $f_s$. Although the switching period $T_{sw}$ is not fixed in variable-frequency control, the average inductor current in each small fixed period $T_s$ can be calculated. Assume the on-time of the upper switching transistor MOS1 within the fixed period $T_s$ is $t_{on}$ and the on-resistance of the switching transistor is not taken into account, the average inductor current $I_{L\_A}$ within the fixed period $T_s$ is expressed by formula (8):

$$I_{L\_A} = \frac{V_{in\_ave} t_{on} f_s - V_{o\_ave}}{R_L} \quad (8)$$

Where, $V_{in\_ave}$ is an average input voltage.

As can be seen from formula (8), the average node voltage $V_{x\_ave}$ within one period depends on the on-time $t_{on}$ of the upper switching transistor MOS1 within the fixed period $T_s$. For an ideal switching power supply BUCK converter, a PWM signal and the node voltage $V_x$ have the same temporal distribution, and the change of the pulse width of the PWM signal can reflect the change of the inductor current, so the inductor current can be estimated according to the on-time of the PWM signal. The converted input voltage $V_{in}[n]$ and the converted output voltage $V_o[n]$ are provided to a digital controller, and then the average inductor current can be easily estimated in the digital controller according to a pulse width modulation signal generated in the digital controller. The ripple value of the inductor current can be calculated in the controller according to formula (9):

$$\Delta i_{L\_A} = \frac{V_{in\_ave} - V_{o\_ave}}{L} \cdot t_{on} \quad (9)$$

Where, $\Delta i_{L\_A}$ is the ripple value of the inductor current, and L is the inductance.

The above solution is implemented under the condition that the switching delay of the BUCK switching power supply is ignored. In actual application, with the increase of the load current and the switching frequency, a switching delay ta between the PWM signal and the node voltage $V_x$ will increase nonlinearly, so a large estimation error will be caused if the PWM signal is used for current estimation.

Figure 3:
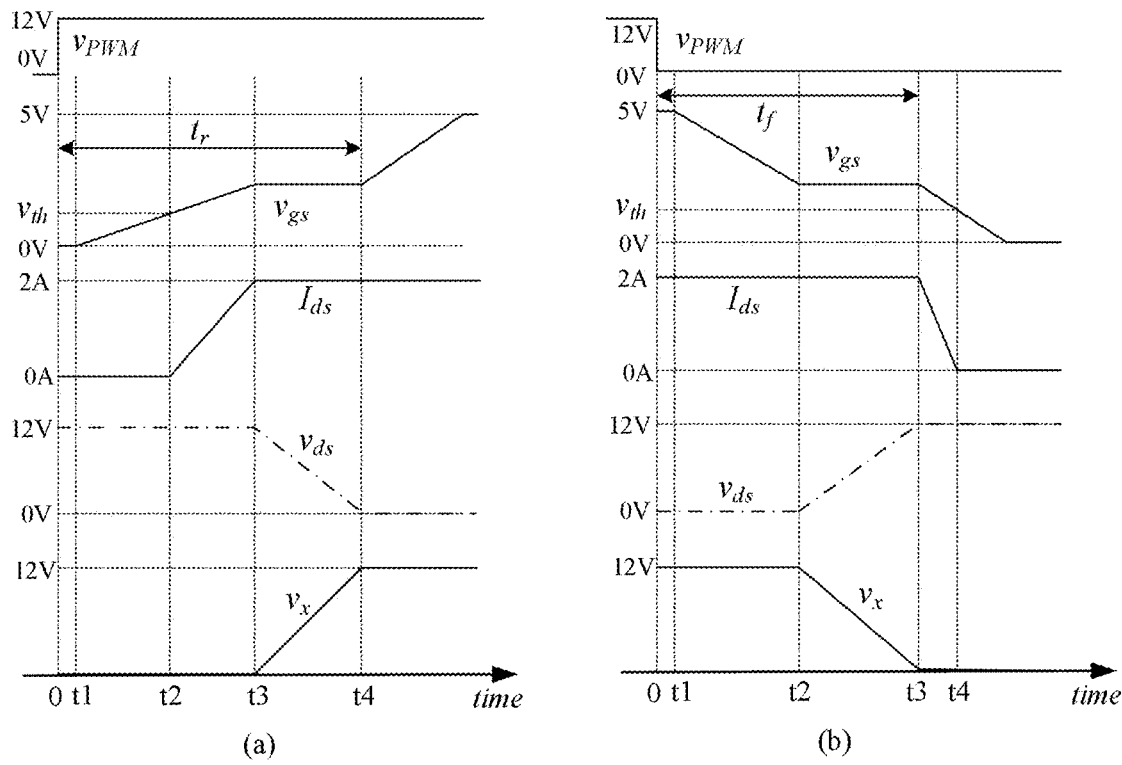
FIG. 3A illustrates switching characteristics when the BUCK switching power supply is in an on-state.
FIG. 3B illustrates switching characteristic when the BUCK switching power supply is in an off-state.

FIG. 3 illustrates switching characteristics when a MOSFET of the BUCK switching power supply is in an on-state and an off-state. FIG. 3 show variation curves of a gate-source voltage $V_{gs}$, a source-drain current $I_{ds}$, a source-drain voltage $V_{ds}$ and the node voltage $V_x$ of the upper switching transistor MOS1 when the MOSFET is turned on and off, wherein $V_{th}$ is a threshold voltage of the switching transistor, and $V_{PWM}$ is the voltage of a PWM drive signal. Referring to FIG. 3A, when the PWM signal turns from 0 V to 12 V, the node voltage $V_x$ rises to the input voltage 12 V after an on-delay $t_r$. Referring to FIG. 3B, when the PWM signal turns to 0 V from 12 V, the node voltage $V_x$ falls to 12 V after an off-delay $t_d$. In the on-state of the upper switching transistor MOS1, part of the switching delay ta depends on the inductor current ($t_2$-$t_3$), and this part of delay will increase with the increase of the inductor current. In the off-state of the upper switching transistor MOS1, the delay has less dependence on the inductor current ($t_3$-$t_4$). The on-delay $t_r$ and the off-delay $t_d$ are different and in a nonlinear relation with the inductor current, leading to a difference between the pulse width of the PWM signal and the actual node voltage. So, in actual application, the WPM signal is not used to calculate the node voltage $V_x$, instead, a simple comparator is used to detect the level change of the node voltage $V_x$, compare the node voltage $V_x$ with the reference voltage $V_{ref}$, and then provide comparative information to the digital controller as a one-bit switching signal SW. Because the delay of the comparator is fixed, the change of the node voltage $V_x$ can truly represented in the digital controller.

In this embodiment, the switching signal counting module is configured to detect and count switching signals, compare the node voltage $V_x$ with the reference voltage $V_{ref}$ by means of the comparator, and output the switching signal SW. If the upper switching transistor MOS1 is turned off and the lower switching transistor MOS2 is turned on, the node voltage $V_x$ is a ground potential and is less than the reference voltage $V_{ref}$, and the switching signal SW output by the comparator is 0. If the upper switching transistor MOS1 is turned on and the lower switching transistor MOS2 is turned off, the node voltage $V_x$ is the input voltage $V_{in}$ and is greater than the reference voltage $V_{ref}$, and the switching signal SW output by the comparator is 1. Switching signals which are 1 within one fixed period $T_s$ are counted by a high-frequency counter, and the duty cycle duty[n] in each period is output.

Figure 4:
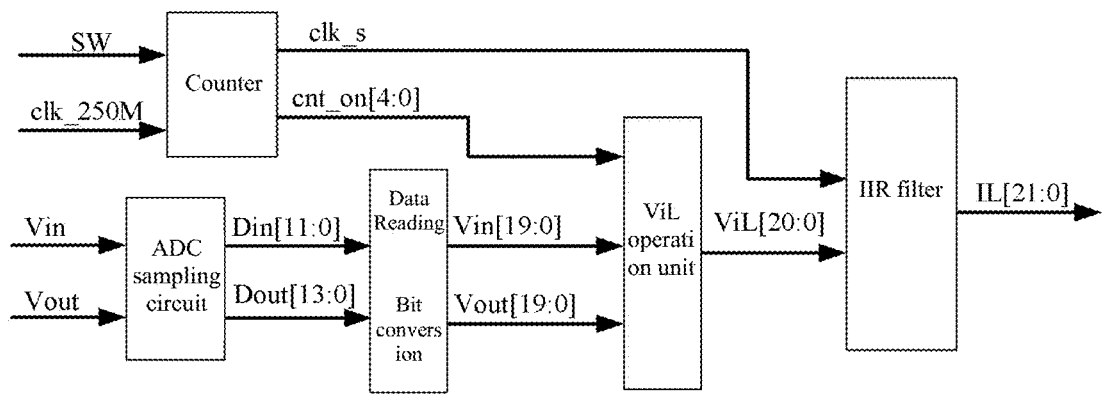
FIG. 4 is a hardware block diagram of inductor current estimation.

Referring to FIG. 4 which is a hardware block diagram of inductor current estimation, the switching signals SW output by the comparator are counted by the counter, the clock period of counting is 250 M, wherein clk_s is a clock with the frequency being divided by the counter, the clock period obtained after frequency division is $T_s$, a counting result cnt_on[4:0] of the switching signals SW is output at the end of each fixed period $T_s$, and the result is set to 0 at the beginning of the next period. The fixed clock period $T_x$ obtained after division is used as the sampling period of the IIR digital filter.

Figure 5:
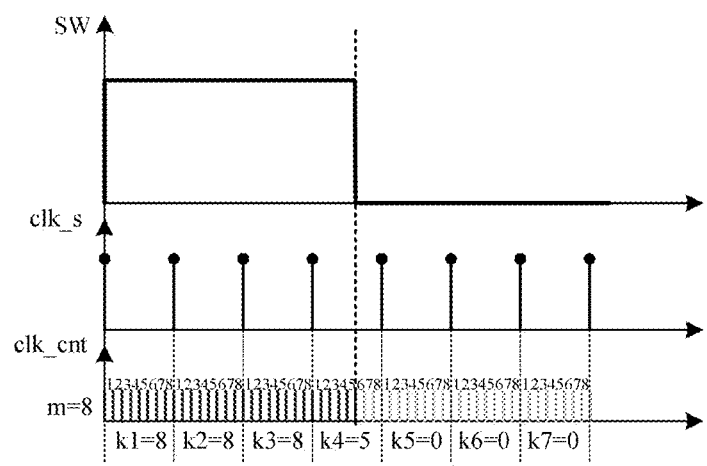
FIG. 5 is a temporal chart of counting and sampling.

FIG. 5 is a temporal chart of switching signal SW counting and digital filter sampling of the inductor current estimation method, wherein the switching signals SW are input to the digital controller by the comparator and are counted at a maximum frequency clk_cnt, the digital filter adopts a low frequency clk_s as the sampling frequency, and the counting frequency clk_cnt is m times greater than the sampling frequency clk_s. Within an $n^{th}$ sampling period Ts, if the number of SW high levels detected within m clk_cnt periods is $k_n$, the average voltage $V_{iL}[n]$ of the two terminals of the inductor L and the parasitic resistor $R_L$ within this sampling period can be calculated, as shown in formula (10).

$$V_{iL}[n] = \frac{k_n}{m} \cdot V_{in}[n] - V_{out}[n] \tag{10}$$

$$\text{Where, duty}[n] = \frac{k_n}{m}.$$

In a continuous domain, the inductor current $I_L$ is expressed as an s-domain expression, as shown in (11). The s-domain expression is discretized, and a differential equation shown in (12) is finally obtained by bilinear transformation.

$$I_L = \frac{V_{iL}}{sL + R_L} \tag{11}$$

$$I_L[n] = c_1 \cdot I_L[n-1] + c_2 \cdot V_{iL}[n] + V_{iL}[n-1]) \tag{12}$$

$$c_1 = \left(2 \cdot \frac{L}{R_L T_s} - 1\right)\left(2 \cdot \frac{L}{R_L T_s} + 1\right) \tag{13}$$

$$c_2 = 1 / \left[\left(2 \cdot \frac{L}{R_L T_s} + 1\right) \cdot R_L\right] \tag{14}$$

Where, $I_L$ represents an instantaneous inductor current in the continuous domain, $I_L[n]$ represents the inductor current in the $n^{th}$ sampling period in a discrete domain (the inductor current estimated by the digital filter), $V_{iL}$ represents an instantaneous voltage of the two terminals of the inductor L and the parasitic resistor $R_L$, and $V_{iL}[n]$ represents the average voltage of the two terminals of the inductor L and the parasitic resistor $R_L$ within the $n^{th}$ sampling period, and ciand czare coefficients of the digital filter.

Figure 6:
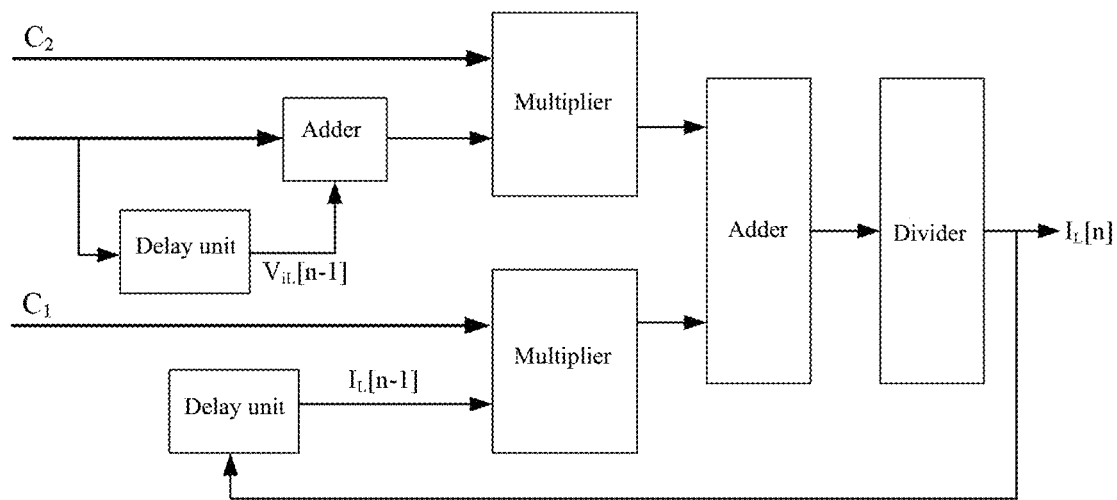
FIG. 6 is a design block diagram of an infinite impulse response (IIR) filter.

FIG. 6 is a digital design block diagram of a one-order IIR filter, which can implement the above differential equation. Because the coefficients $c_1$ and $c_2$ of the digital filter are decimals, the decimal point of data needs to be moved leftwards by N places in the digitization process, that is, coefficients $c_1$ and $c_2$ are scaled up by $2^N$ times to obtain $C_1$ and $C_2$. The average voltage $V_{iL}[n]$ of the two terminals of the inductor L and the parasitic resistor $R_L$ is used as an input, and $V_{iL}[n-1]$ output by a delay unit is used as an input of the previous sampling period, wherein the $n^{th}$ period is the current period, and the $(n-1)^{th}$ period is the previous period; and the inductor current $I_L[n]$ is used as an output, and $I_L[n-1]$ output by the delay unit is used as an output of the previous sampling period. Wherein, $C_1$ and $C_2$ are fixed values under a certain condition, so multipliers can be implemented by moving the decimal point, thus increasing the calculation speed. Because the coefficients of the filter are scaled up in the calculation process, a final output needs to be processed by a divider, which can be implemented by moving the decimal point rightwards by N places.

Figure 7:
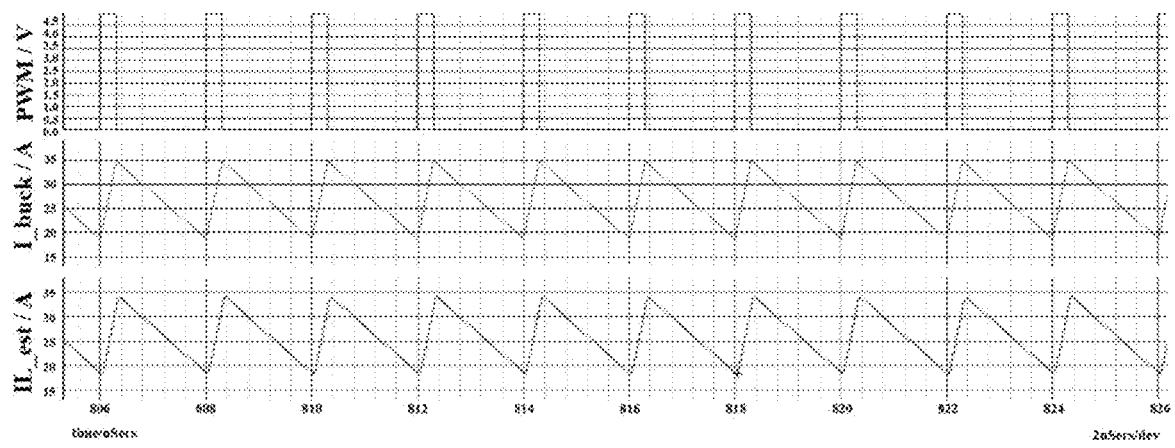
FIG. 7 is a SIMPLIS simulation oscillogram of the inductor current estimation method applied to the BUCK switching power supply according to the invention.

FIG. 7 is a SIMPLIS simulation oscillogram of the inductor current estimation method applied to the BUCK switching power supply according to the invention, wherein PWM is the control signal waveform of the upper switching transistor MOS1, I_buck is an actual value of the inductor current, and IL_est is an estimated value of the inductor current. As can be seen from FIG. 7, the average value and ripple valve of the actual inductor current can be obtained accurately according to the estimated value of the inductor current.

The invention is described in further detail above in conjunction with drawings, but the specific embodiments of the invention are not limited to the above description, and the above embodiments are merely preferred ones of the invention. Any modifications, equivalent substitutions and improvements made by those skilled in the art without departing from the principle of the invention should fall within the protection scope of the invention.

What is claimed is:

1. An inductor current estimation method for a DC-DC switching power supply, using a voltage sampler, a data converter, a switching signal counter including a comparator, an inductor voltage calculator, and a digital filter, the method comprising:

inputting an input voltage ($V_{in}$) and an output voltage ($V_o$) of a DC-DC switching power supply to the voltage sampler to obtain an input voltage digital quantity ($D_{in}[n]$) and an output voltage digital quantity ($D_o[n]$), then performing an operation and bit conversion by the data converter to obtain a converted input voltage ($V_{in}[n]$) and a converted output voltage ($V_o[n]$) which have a same number of bits, and outputting the converted input voltage ($V_{in}[n]$) and the converted output voltage ($V_o[n]$) to the inductor voltage calculator, wherein the voltage sampler comprises a sampling circuit and an analog-to-digital converter (ADC), where the sampling circuit samples voltages-obtained by scaling the input voltage ($V_{in}$) and the output voltage ($V_o$) in proportion, by means of voltage dividing resistors, and the voltages are amplified by single-ended to differential amplifiers and then output to the corresponding ADC, such that the input voltage digital quantity ($D_{in}[n]$) and the output voltage digital quantity ($D_o[n]$) are obtained; and comparing a node voltage ($V_x$) with a reference voltage ($V_{ref}$) by the comparator of the switching signal counter to output actual switching signals, then obtaining a duty cycle (duty[n]) by the switching signal counter counting module and outputting the duty cycle (duty[n]) to the inductor voltage calculator;

calculating an average voltage ($V_{iL}[n]$) of two terminals of an inductor (L) and a parasitic resistor ($R_L$) by the inductor voltage calculator to reduce a sampling frequency of the voltage sampler; and performing filtering by the digital filter to obtain an estimated inductor current ($I_L[n]$).

2. The inductor current estimation method for a DC-DC switching power supply according to claim 1, wherein the data converter receives the input voltage digital quantity ($D_{in}[n]$) and the output voltage digital quantity ($D_o[n]$) and operates according to the following formulas to obtain an actual input voltage $V_{in}$ and an actual output voltage $V_o$;

$$V_{in} = \left(\frac{D_{in}[n]}{2^{N_1-1}} - 1\right) \cdot \frac{V_2}{V_1}$$

$$V_o = \left(\frac{D_o[n]}{2^{N_2-1}} - 1\right) \cdot \frac{V_2}{G_2}$$

where, $D_{in}[n]$ is the input voltage digital quantity, $D_o[n]$ is the output voltage digital value, and n indicates that the corresponding digital quantity is in a $n^{th}$ period;

the number of ADC bits of the input voltage ($V_{in}$) and the number of ADC bits of the output voltage ($V_o$) are $N_1$ and $N_2$ respectively, and an input range of the input voltage ($V_{in}$) and an input range of the output voltage ($V_o$) are $\pm V_1$ and $\pm V_2$ respectively;

$G_1$ and $G_2$ are an input sampling gain coefficient and an output sampling gain coefficient; and the actual input voltage $V_{in}$ and the actual output voltage $V_o$ obtained by the operation are converted into digital quantities with a same number of bits by bit conversion, namely the converted input voltage ($V_{in}[n]$) and the converted output voltage ($V_o[n]$).

3. The inductor current estimation method for a DC-DC switching power supply according to claim 2, wherein the input sampling gain coefficient and the output sampling gain coefficient are calculated by:

$$G_1 = A_1 \cdot \frac{R_2}{R_1 + R_2}$$

$$G_2 = A_2 \cdot \frac{R_4}{R_3 + R_4}$$

where, $R_1$ and $R_2$ are a pair of voltage dividing resistors for the input voltage ($V_{in}$), $R_3$ and $R_4$ are a pair of voltage dividing resistors for the output voltage ($V_o$), and $A_1$ and $A_2$ are amplification coefficients of the single-ended to differential amplifiers for sampling the input voltage ($V_{in}$) and the output voltage ($V_o$) respectively.

4. The inductor current estimation method for a DC-DC switching power supply according to claim 1, wherein the switching signal counter is configured to detect and count the switching signals, and the node voltage ($V_x$) is compared with the reference voltage ($V_{ref}$) by the comparator to output the switching signals;

if an upper switching transistor (MOS1) is turned off and a lower switching transistor (MOS2) is turned on, the node voltage ($V_x$) is a ground potential and is less than the reference voltage ($V_{ref}$), and the comparator outputs a switching signal 0;

if the upper switching transistor (MOS1) is turned on and the lower switching transistor (MOS2) is turned off, the node voltage ($V_x$) is the input voltage ($V_{in}$) and is greater than the reference voltage ($V_{ref}$), and the comparator outputs a switching signal 1; and switching signals 1 output within a fixed period $T_s$ are counted by a high-frequency counter, and the duty cycle (duty[n]) in each period is output.

5. The inductor current estimation method for a DC-DC switching power supply according to claim 4, wherein the duty cycle (duty[n]) is calculated by:

$$\text{duty}[n] = k_n/m$$

where, duty[n] is the duty cycle, m is a total number of times of counting permitted within the fixed period $T_s$, and $k_n$ is the number of switching signals within the $n^{th}$ fixed period $T_s$.

6. The inductor current estimation method for a DC-DC switching power supply according to claim 1, wherein the average voltage ($V_{iL}[n]$) of the two terminals of the inductor (L) and the parasitic resistor ($R_L$) is calculated by:

$$V_{iL}[n] = \text{duty}[n] \cdot V_{in}[n] - V_o[n]$$

where, $V_{iL}[n]$ is the average voltage of the two terminals of the inductor (L) and the parasitic resistor ($R_L$), $V_{in}[n]$ is the converted input voltage, and $V_o[n]$ is the converted output voltage.

* * * * *